(12) United States Patent
Preisler

(10) Patent No.: US 7,380,814 B2
(45) Date of Patent: Jun. 3, 2008

(54) AIR BAG COVER ASSEMBLY INCLUDING AN AIR BAG DEPLOYMENT CONCENTRATOR AND AT LEAST ONE INTEGRALLY HINGED AIR BAG DOOR

(75) Inventor: Darius J. Preisler, Macomb, MI (US)

(73) Assignee: Cadence Innovation LLC, Troy, MI (US)

( * ) Notice: Subject to any disclaimer, the term of this patent is extended or adjusted under 35 U.S.C. 154(b) by 349 days.

(21) Appl. No.: 11/211,947

(22) Filed: Aug. 25, 2005

(65) Prior Publication Data

US 2007/0045994 A1    Mar. 1, 2007

(51) Int. Cl.
*B60R 21/20* (2006.01)
(52) U.S. Cl. .................................. 280/728.3
(58) Field of Classification Search ............. 280/728.3, 280/732, 730.1, 730.2
See application file for complete search history.

(56) References Cited

U.S. PATENT DOCUMENTS

| | | | |
|---|---|---|---|
| 4,952,351 A | 8/1990 | Parker et al. | |
| 5,466,412 A | 11/1995 | Parker et al. | |
| 6,145,871 A * | 11/2000 | Davis et al. | 280/728.2 |
| 6,168,188 B1 | 1/2001 | Preisler et al. | |
| 6,203,056 B1 * | 3/2001 | Labrie et al. | 280/728.3 |
| 6,428,738 B1 | 8/2002 | Winget et al. | |
| 6,447,004 B1 * | 9/2002 | Kawakubo et al. | 280/728.3 |
| 6,467,801 B1 | 10/2002 | Preisler et al. | |
| 6,672,611 B2 | 1/2004 | Preisler et al. | |
| 6,716,519 B2 * | 4/2004 | Ueno et al. | 428/308.4 |
| 7,014,901 B2 * | 3/2006 | Sanae et al. | 428/57 |

\* cited by examiner

*Primary Examiner*—Faye M. Fleming
(74) *Attorney, Agent, or Firm*—Harness Dickey & Pierce P.L.C.

(57) ABSTRACT

An air bag cover assembly including an air bag deployment concentrator such as a chute and first and second integrally hinged air bag doors is provided wherein a tear seam is located both inside and outside a channel of the chute. The tear seam interconnects the air bag doors to allow selective air bag deployment through a weakened area formed by the tear seam and portions of the film sheet immediately adjacent the weakened area. The assembly also includes first and second sets of hinges for hingedly connecting the first and second air bag doors, respectively, to a front panel both inside and outside the channel to facilitate pivotal movement of the air bag doors away from the air bag to allow deployment of the air bag through the channel, through the weakened area and through the portions of the film sheet during impact of the vehicle.

20 Claims, 3 Drawing Sheets

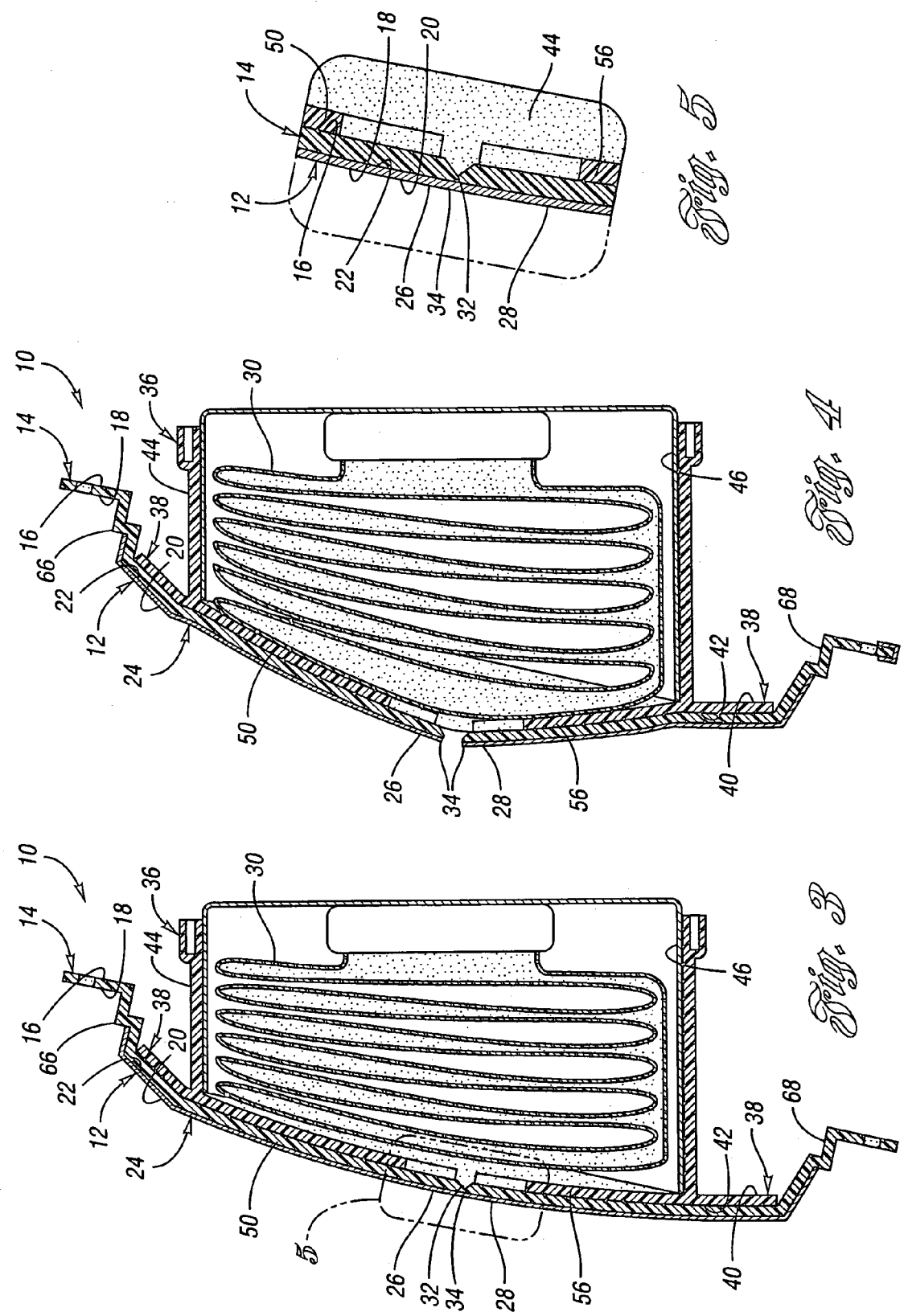

AIR BAG COVER ASSEMBLY INCLUDING AN AIR BAG DEPLOYMENT CONCENTRATOR AND AT LEAST ONE INTEGRALLY HINGED AIR BAG DOOR

BACKGROUND OF THE INVENTION

1. Field of the Invention

This invention relates to air bag cover assemblies including an air bag deployment concentrator and at least one integrally hinged air bag door.

2. Background Art

U.S. Pat. No. 6,428,738 discloses a painted plastic component which includes a painted film sheet and a one-piece thermoplastic elastomeric structural carrier. A bottom contact surface of the film sheet bonds with a front contact surface of the structural carrier by diffusion between the contact surfaces thereof within a mold cavity of an injection mold separate from the mold cavity of a vacuum mold which is utilized to vacuum-mold the film sheet to form the desired painted plastic component.

One limitation of such a component is that when such component takes the form of an air bag cover, it is difficult to tear through the film sheet.

U.S. Pat. Nos. 4,952,351 and 5,466,412, the Parker patents, teach a method of manufacturing an air bag cover for an inflatable air bag system including a bondable film carrier, which is painted after the film carrier is molded.

U.S. Pat. No. 6,168,188 discloses a molded instrument panel having a plastic front panel and incorporating an integral air bag door wherein the air bag door is hinged to the front panel by overlapping integral plastic members to ensure that the door does not separate from the instrument panel during air bag deployment. The instrument panel also includes a plastic frame integrally formed on an inner surface of the front panel which together with the door, encloses an uninflated air bag. Preferably, the hinge and portions of the frame are formed by a pressurized fluid so as to be hollow, thereby facilitating swinging movement of the door while preventing sink marks on an outer surface of the front panel.

U.S. Pat. No. 6,467,801 discloses an air bag deployment chute for deploying an air bag through a panel member having a groove. The deployment chute comprises a stationary portion and a door portion. The stationary portion includes a base and a peripheral wall integrally connected thereto. The base has a first surface attached to an inner surface of the panel member and an opening to define an inner periphery of the base. The inner periphery defines an open area which is circumscribed by the groove viewed in plan when the deployment chute is attached to the panel member. The inner periphery is positioned against the structurally weakened area of the panel member so that the groove is supported by the base to prevent inadvertent pivotal movement of the door portion toward the air bag when force is applied on the outer surface of the panel member.

U.S. Pat. No. 6,672,611 discloses an air bag deployment chute and panel assembly for deploying an air bag through a panel member having a groove. The deployment chute comprises a stationary portion and one or more door portions depending on the shape of the prescribed tear pattern (i.e., "I", "H" or "U"). The stationary portion includes a base and a peripheral wall integrally connected thereto. The base has a first surface attached to an inner surface of the panel member and an opening to define an inner periphery of the base. The inner periphery is positioned against a structurally weakened area of the panel member defined by the groove so that outer portions of the groove are supported by the base to prevent inadvertent pivotal movement of the one or more door portions toward the air bag when force is applied on the outer surface of the panel member.

SUMMARY OF THE INVENTION

An object of the present invention is to provide an air bag cover assembly including an air bag deployment concentrator and at least one integrally hinged air bag door wherein a film sheet of the assembly can be torn through in a cost effective fashion.

In carrying out the above object and other objects of the present invention, an air bag cover assembly including an air bag deployment concentrator and at least one integrally hinged air bag door is provided. The assembly includes a plastic structural carrier having an inner surface and an outer surface, and a film sheet having an outer show surface and an inner surface bonded to the outer surface of the carrier to form a front panel. A first air bag door is adapted to enclose an uninflated air bag and a tear seam forms a structurally weakened area of the carrier immediately adjacent the first air bag door to allow selective air bag deployment through the weakened area and portions of the film sheet immediately adjacent the weakened area. An air bag deployment concentrator deploys the air bag through the weakened area and the portions of the film sheet. The deployment concentrator includes a peripheral wall which defines a channel through which the air bag may deploy and is configured to receive the air bag within the channel to guide the air bag through the channel during deployment of the air bag wherein the tear seam is located in the inner surface of the carrier both inside and outside the channel. A first set of hinges hingedly connects the first air bag door to the front panel to allow the first air bag door to swing open. The first set of hinges connects the first air bag door to the front panel both inside and outside the channel to facilitate pivotal movement of the first air bag door away from the air bag to allow deployment of the air bag through the channel, through the weakened area and through the portions of the film sheet during impact of the vehicle.

The film sheet may be selected from the group consisting of polyester, polyurethane and polycarbonate.

The film sheet may be coated with a layer of acrylic color, a layer of polyvinylidine fluoride and an acrylic clear coat layer.

The plastic may be a thermoplastic elastomer.

The thermoplastic elastomer may be TPO.

The convertor may include a base integrally connected to the peripheral wall wherein portions of the base outside the channel may form hinges of the first set of hinges.

The first set of hinges may include a central hinge integrally connected to the peripheral wall inside the channel.

The assembly may include a hole which extends completely therethrough at one end of the assembly, and the tear seam may extend from the hole to an opposite end of the assembly. Portions of the carrier on opposite sides of the tear seam may be separated from each other during air bag deployment.

The peripheral wall may connect the portions of the carrier after air bag deployment.

Each of the first set of hinges may include a plastic member extending between and in a direction generally parallel to the front panel and the first door. The plastic members may bend but do not break away from either the first door or the panel to ensure that the first door does not separate from the panel during air bag deployment.

Further in carrying out the above object and other objects of the present invention, an air bag cover assembly including an air bag deployment concentrator and a pair of integrally hinged air bag doors is provided. The assembly includes a plastic structural carrier having an inner surface and an outer surface, and a film sheet having an outer show surface and an inner surface bonded to the outer surface of the carrier to form a front panel. First and second air bag doors are adapted to enclose an uninflated air bag and a tear seam forms a structurally weakened area of the carrier and interconnects the first and second air bag doors to allow selective air bag deployment through the weakened area and portions of the film sheet immediately adjacent the weakened area. The air bag deployment concentrator deploys the air bag through the weakened area and the portions of the film sheet. The deployment concentrator includes a peripheral wall which defines a channel through which the air bag may deploy. The peripheral wall is configured to receive the air bag within the channel to guide the air bag through the channel during deployment of the air bag. The tear seam is located in the inner surface of the carrier both inside and outside the channel. First and second sets of hinges hingedly connect the first and second air bag doors, respectively, to the front panel to allow the first and second air bag doors to swing open. The first and second sets of hinges connect the first and second air bag doors to the front panel both inside and outside the channel to facilitate pivotal movement of the first and second air bag doors away from the air bag to allow deployment of the air bag through the channel, through the weakened area and through the portions of the film sheet during impact of the vehicle.

The film sheet may be selected from the group consisting of polyester, polyurethane and polycarbonate.

The film sheet may be coated with a layer of acrylic color, a layer of polyvinylidine fluoride and an acrylic clear coat layer.

The plastic may be a thermoplastic elastomer.

The thermoplastic elastomer may be TPO.

The concentrator may include a base integrally connected to the peripheral wall wherein portions of the base outside the channel may form hinges of the first and second sets of hinges.

Each set of hinges may include a central hinge integrally connected to the peripheral wall inside the channel.

The assembly may include a hole which extends completely therethrough at one end of the assembly, and the tear seam may extend from the hole to an opposite end of the assembly. Portions of the carrier on opposite sides of the tear seam may be separated from each other during air bag deployment.

The peripheral wall may connect the portions of the carrier after air bag deployment.

Each hinge of the first and second sets of hinges may include a plastic member extending between and in a direction generally parallel to the front panel and the first and second doors. The plastic members may bend but do not break away from either the doors or the panel to ensure that the doors do not separate from the panel during air bag deployment.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a sectional view of the assembly of FIGS. 1 and 2 taken along line 3-3 in FIG. 2 with a supported air bag canister having an air bag therein;

FIG. 4 is a view similar to the view of FIG. 3 during air bag deployment; and

FIG. 5 is an enlarged view of an area of FIG. 3 designated at 5.

DETAILED DESCRIPTION OF THE PREFERRED EMBODIMENTS

Figure 1:
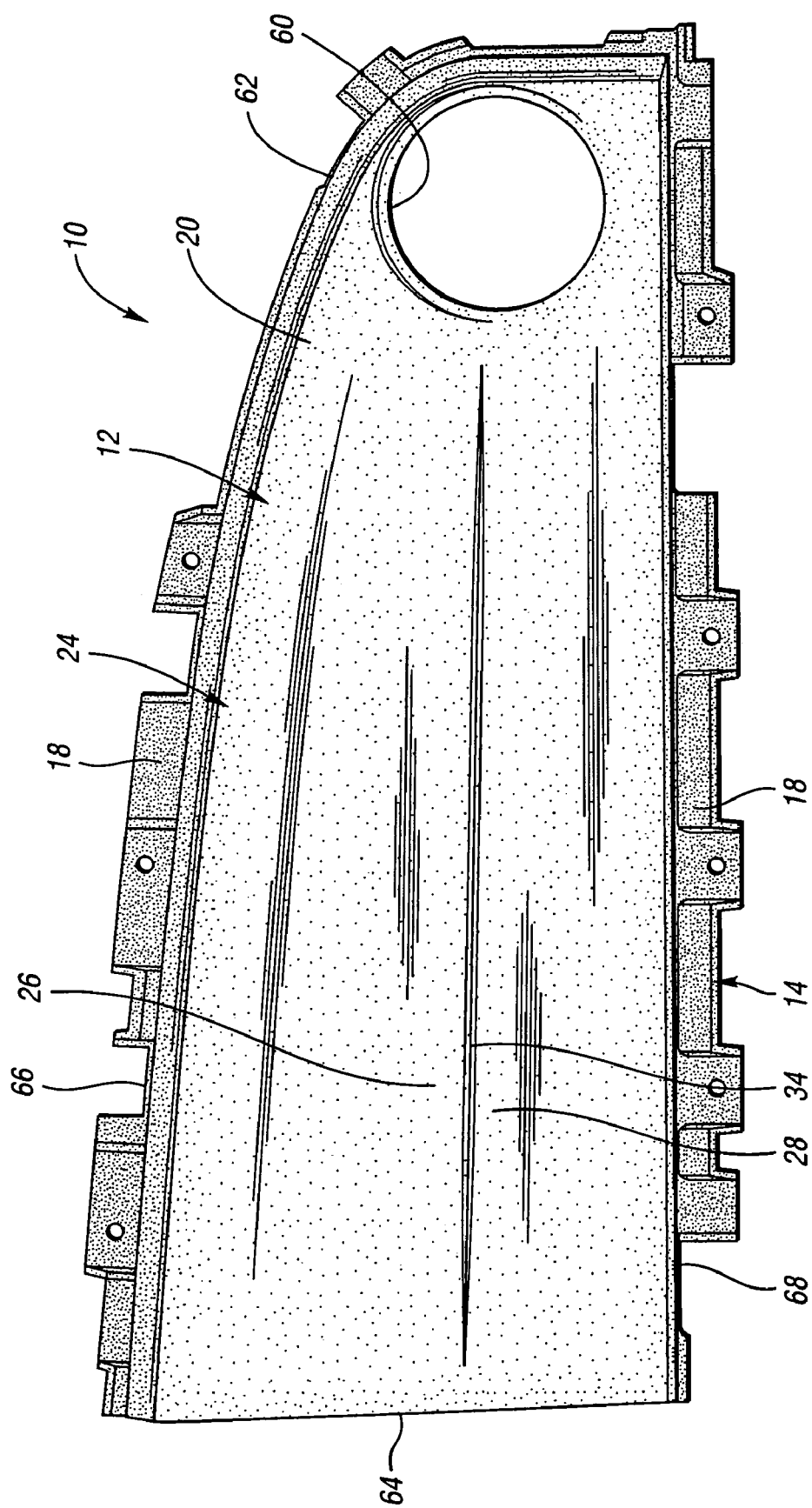
FIG. 1 is a front elevational view of an assembly constructed in accordance with one embodiment of the present invention.

Referring now to the drawing figures, there is illustrated in FIG. 1 a front elevational view of one type of air bag cover assembly, generally indicated at 10, adapted to be mounted on an automotive side door. The air bag cover assembly 10 includes a painted one-piece outer layer, generally indicated at 12, composed of a film sheet, preferably a pre-painted film sheet, which is vacuum molded in a vacuum mold from a material compatible with an air bag body or structural carrier, generally indicated at 14, which is preferably injection molded in an injection mold. The air bag body 14 is preferably composed of a thermoplastic elastomer. The elastomer of the air bag body or structural carrier 14 should be compatible with the outer layer 12 so that a bottom contact surface of the outer layer 12, bonds with the front contact surface of the air bag body 14 by diffusion between the surfaces thereof in the injection mold to prevent the air bag body 14 from separating from the outer layer 12 during use of the air bag cover 10.

The outer layer 12 is composed of a film sheet that is pre-painted. The film sheet is preferably a polyester sheet such as Mylar®, a polyurethane or polycarbonate sheet.

In the preferred embodiment, the outer layer comprises a film sheet with the following coatings placed thereon, a layer of acrylic color in mating contact with the film sheet and a layer of polyvinylidine fluoride (PVDF) with an acrylic clear coat to protect the film from damage and to provide film elasticity, chemical resistance, stain resistance, weathering and UV protection.

The thermoplastic elastomer of the air bag body or structural carrier 14 is preferably a thermoplastic elastomer such as a thermoplastic polyolefin, thermoplastic urethane, polyester, polycarbonate, a mixture of polycarbonate and ABS (acrylonitrile/butadiene/styrene) or similar material.

The durometer and elastic or flex modulus of the materials also vary depending on the desired stiffness of the component. Typically, the durometer of the air bag body 14 will be in the range of about 20 Shore D to 100 Shore D, while the flexural modulus will be in the range of about 15,000 to about 400,000 psi. Also, typically, the durometer of the outer layer 12 will be in the range of about 15 Shore A to 100 Shore A. These ranges of course vary depending on the desired plastic component to be manufactured and are only illustrative of one example.

Figure 2:
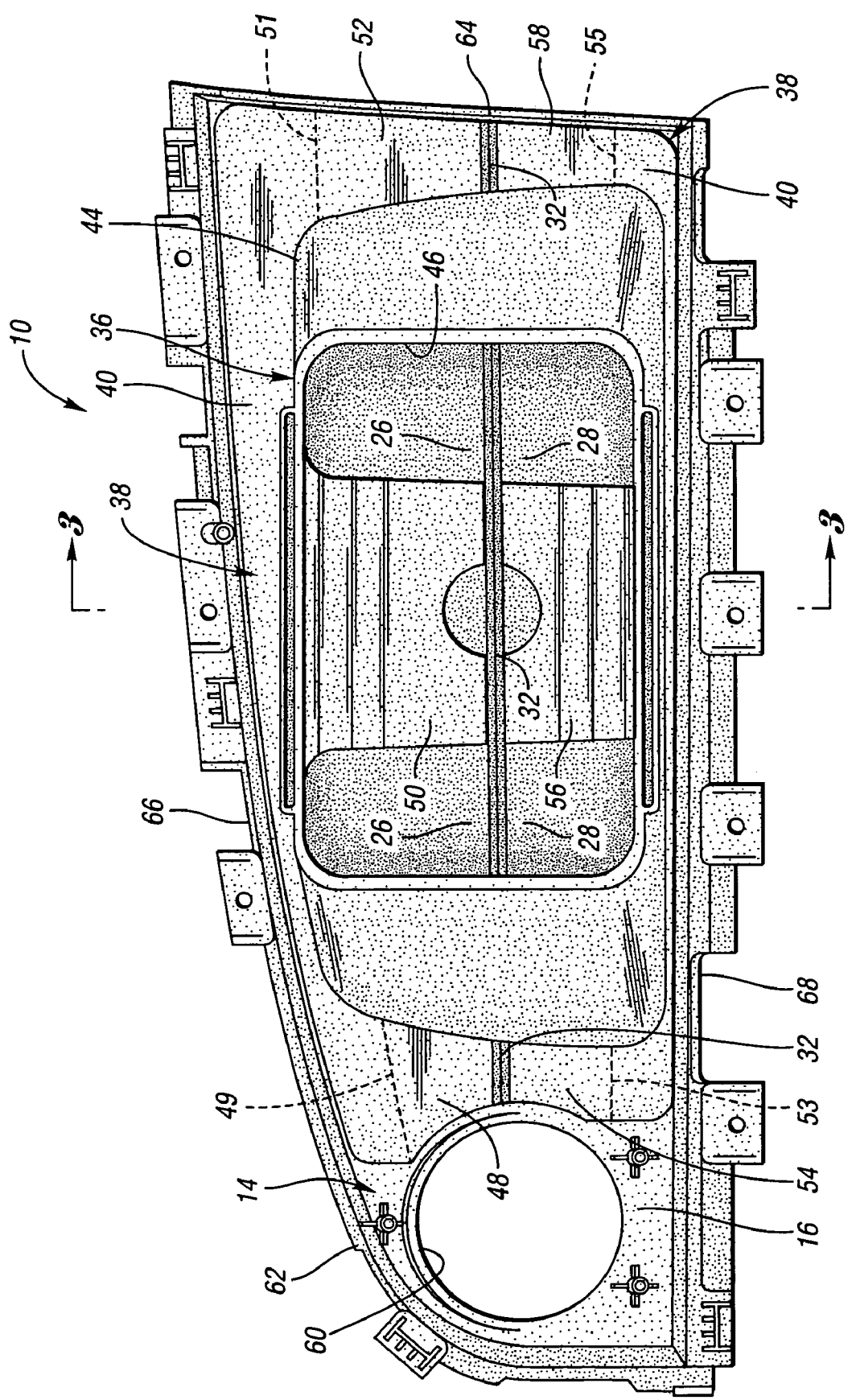
FIG. 2 is a rear elevational view of the assembly depicted in FIG. 1.

As depicted in FIG. 3, a sectional view of the air bag cover assembly of FIGS. 1 and 2 taken along line 3-3 of FIG. 2, in a manufactured component, the air bag body or structural carrier 14 supports the outer layer 12 which has a pre-painted coating placed thereon, followed by a base coat, preferably a layer of acrylic color, and a clear coat, preferably an acrylic clear coat and a layer of PVDF.

The body of the air bag cover 14 may also be formed from thermoplastic polyolefin, polycarbonate, tee tpe, sebs tpe, and a mixture of polycarbonate and acrylonitrile/butadiene/styrene (ABS). The corresponding film sheet 12 must be compatible with the plastic of the body so that diffusion between contact surfaces occurs. Additionally, the laminate should be compatible with the substrate on which the laminate is to be adhered. In general, this requirement is achieved by selecting a structural carrier 14 with at least one or more materials common to the substrate on which the laminate is to be adhered. As an example, with a thermoplastic polyolefin substrate, the structural carrier should include polypropylene.

In an alternative embodiment, the mold can be modified to produce a plastic component with embossed lettering. This embossed effect is achieved by etching into the mold the desired pattern or letters so that the letters have at least a 0.5 mm radius on the edge of the letter, or else the film may tear and stretch.

Referring now to FIGS. 3-5, the plastic structural carrier 14 has an inner surface 16 and an outer surface 18. The film sheet 12 has an outer show surface 20 and an inner surface 22 bonded to the outer surface 18 of the carrier 14 to form a front panel, generally indicated at 24, first and second air bag doors 26 and 28, respectively, adapted to enclose an uninflated air bag 30 (i.e., FIG. 3) and a tear seam 32 which forms a structurally weakened area of the carrier 14. The tear seam 32 interconnects the first and second air bag doors 26 and 28 to allow selective air bag deployment through the weakened area and portions 34 of the film sheet 12 immediately adjacent the weakened area.

The assembly 10 also includes an air bag deployment concentrator such as a chute, generally indicated at 36, for deploying the air bag 30 through the weakened area and the portions 34 of the film sheet 12. The deployment chute 36 includes a base having upper and lower sections, generally indicated at 38, having inner and outer surfaces 40 and 42, respectively, and a peripheral wall 44 integrally connected to the inner surfaces 40 of the base sections 38 and extending therefrom. The outer surfaces 42 of the base sections 38 are connected to the inner surface 16 of the carrier 14. The peripheral wall 44 defines a channel 46 through which the air bag 30 may deploy. The peripheral wall 44 is configured to receive the air bag 30 within the channel 46 to guide the air bag 30 through the channel 46 during deployment of the air bag 30. The tear seam 32 is located in the inner surface 16 of the carrier 14 both inside and outside the channel 46.

While the concentrator is shown as a chute, it is to be understood that the concentrator could take either forms such as an air bag canister which is used to collect or focus the force of a deploying air bag towards a central portion of the carrier 14 to initiate the tearing of the carrier 14 and the film sheet 12.

The assembly 10 further includes first and second sets of hinges 48, 50, 52 and 54, 56, 58, respectively, for hingedly connecting the first and second air bag doors 26, 28, respectively, to the front panel 24 to allow the first and second air bag doors 26, 28, respectively, to swing open. The first and second sets of hinges 48, 50, 52 and 54, 56, 58, respectively, connect the first and second air bag doors 26, 28 to the front panel 24 both inside and outside the channel 46 to facilitate pivotal movement of the first and second air bag doors 26, 28 away from the air bag 30 to allow deployment of the air bag 30 through the channel 46, through the weakened area and through the portions 34 of the film sheet 12 during impact of the vehicle.

As shown in FIG. 2, portions 48, 52, 54 and 58 of the base sections 38 outside the channel 46 extending between dotted lines 49, 51, 53 and 55, respectively, and the tear seam 32 form hinges of the first and second sets of hinges. The portions 48, 52, 54 and 58 of the base sections 38 are preferably not connected to the peripheral wall 44 to facilitate pivotal movement of their corresponding doors during air bag deployment.

Each set of hinges also includes a central hinge 50 or 56 which is integrally connected to the peripheral wall 36 inside the channel 46.

The assembly 10 also includes a hole 60 which extends completely therethrough at one end 62 of the assembly 10. The tear seam 34 extends from the hole 60 to an opposite end 64 of the assembly 10. Portions 66 and 68 of the carrier 14 on opposite sides of the tear seam 34 between the hole 60 and the end 64 of the assembly are separated from each other during air bag deployment. However, the peripheral wall 44 connects the portions 66 and 68 of the carrier 14 after air bag deployment.

Each hinge 48, 50, 52, 54, 56, and 58 of the first and second sets of hinges is a plastic member which extends between and in a direction generally parallel to the front panel 24 and the first and second doors 26 and 28, respectively. The plastic members bend but do not break away from either the doors 26 and 28 or the panel 24 to ensure that the doors 26 and 28 do not separate from the panel 24 during air bag deployment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An air bag cover assembly including an air bag deployment concentrator and at least one integrally hinged air bag door, the assembly comprising:

a plastic structural carrier having an inner surface and an outer surface;

a film sheet having an outer show surface and an inner surface bonded to the outer surface of the carrier to form a front panel, a first air bag door adapted to enclose an uninflated air bag and a tear seam which forms a structurally weakened area of the carrier immediately adjacent the first air bag door to allow selective air bag deployment through the weakened area and portions of the film sheet immediately adjacent the weakened area;

an air bag deployment concentrator for deploying the air bag through the weakened area and the portions of the film sheet, the deployment concentrator including a peripheral wall which defines a channel through which the air bag may deploy, the peripheral wall being configured to receive the air bag within the channel to guide the air bag through the channel during deployment of the air bag wherein the tear seam is located in the inner surface of the carrier both inside and outside the channel; and a first set of hinges for hingedly connecting the first air bag door to the front panel to allow the first air bag door to swing open wherein the first set of hinges connects the first air bag door to the front panel both inside and outside the channel to facilitate pivotal movement of the first air bag door away from the air bag to allow deployment of the air bag through the channel, through the weakened area and through the portions of the film sheet during impact of the vehicle.

2. The assembly as claimed in claim 1, wherein the film sheet is selected from the group consisting of polyester, polyurethane and polycarbonate.

3. The assembly as claimed in claim 1, wherein the film sheet is coated with a layer of acrylic color, a layer of polyvinylidine fluoride and an acrylic clear coat layer.

4. The assembly as claimed in claim 1, wherein the plastic is a thermoplastic elastomer.

5. The assembly as claimed in claim 4, wherein the thermoplastic elastomer is TPO.

6. The assembly as claimed in claim 1, wherein the concentrator includes a base integrally connected to the peripheral wall and wherein portions of the base outside the channel form hinges of the first set of hinges.

7. The assembly as claimed in claim 1, wherein the first set of hinges includes a central hinge integrally connected to the peripheral wall inside the channel.

8. The assembly as claimed in claim 1, wherein the assembly includes a hole which extends completely therethrough at one end of the assembly and wherein the tear seam extends from the hole to an opposite end of the assembly and wherein portions of the carrier on opposite sides of the tear seam are separated from each other during air bag deployment.

9. The assembly as claim in claim 8, wherein the peripheral wall connects the portions of the carrier after air bag deployment.

10. The assembly as claimed in claim 1, wherein each of the first set of hinges includes a plastic member extending between and in a direction generally parallel to the front panel and the first door wherein the plastic members bend but do not break away from either the first door or the panel to ensure that the first door does not separate from the panel during air bag deployment.

11. An air bag cover assembly including an air bag deployment concentrator and a pair of integrally hinged air bag doors, the assembly comprising:
a plastic structural carrier having an inner surface and an outer surface;
a film sheet having an outer show surface and an inner surface bonded to the outer surface of the carrier to form a front panel, first and second air bag doors adapted to enclose an uninflated air bag and a tear seam which forms a structurally weakened area of the carrier and interconnects the first and second air bag doors to allow selective air bag deployment through the weakened area and portions of the film sheet immediately adjacent the weakened area;
an air bag deployment concentrator for deploying the air bag through the weakened area and the portions of the film sheet, the deployment concentrator including a peripheral wall defining a channel through which the air bag may deploy, the peripheral wall being configured to receive the air bag within the channel to guide the air bag through the channel during deployment of the air bag wherein the tear seam is located in the inner surface of the carrier both inside and outside the channel; and
first and second sets of hinges for hingedly connecting the first and second air bag doors, respectively, to the front panel to allow the first and second air bag doors to swing open wherein the first and second sets of hinges connect the first and second air bag doors to the front panel both inside and outside the channel to facilitate pivotal movement of the first and second air bag doors away from the air bag to allow deployment of the air bag through the channel, through the weakened area and through the portions of the film sheet during impact of the vehicle.

12. The assembly as claimed in claim 11, wherein the film sheet is selected from the group consisting of polyester, polyurethane and polycarbonate.

13. The assembly as claimed in claim 11, wherein the film sheet is coated with a layer of acrylic color, a layer of polyvinylidine fluoride and an acrylic clear coat layer.

14. The assembly as claimed in claim 11, wherein the plastic is a thermoplastic elastomer.

15. The assembly as claimed in claim 14, wherein the thermoplastic elastomer is TPO.

16. The assembly as claimed in claim 11, wherein the concentrator includes a base integrally connected to the peripheral wall and wherein portions of the base outside the channel form hinges of the first and second sets of hinges.

17. The assembly as claimed in claim 11, wherein each set of hinges includes a central hinge integrally connected to the peripheral wall inside the channel.

18. The assembly as claimed in claim 11, wherein the assembly includes a hole which extends completely therethrough at one end of the assembly and wherein the tear seam extends from the hole to an opposite end of the assembly and wherein portions of the carrier on opposite sides of the tear seam are separated from each other during air bag deployment.

19. The assembly as claim in claim 18, wherein the peripheral wall connects the portions of the carrier after air bag deployment.

20. The assembly as claimed in claim 11, wherein each hinge of the first and second sets of hinges includes a plastic member extending between and in a direction generally parallel to the front panel and the first and second doors wherein the plastic members bend but do not break away from either the doors or the panel to ensure that the doors do not separate from the panel during air bag deployment.

* * * * *